US011840227B2

(12) United States Patent
Yasui

(10) Patent No.: US 11,840,227 B2
(45) Date of Patent: Dec. 12, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 17/463,579

(22) Filed: Sep. 1, 2021

(65) Prior Publication Data

US 2022/0063618 A1  Mar. 3, 2022

(30) Foreign Application Priority Data

Sep. 3, 2020 (JP) ................................. 2020-148141

(51) Int. Cl.
*B60W 30/14* (2006.01)
*B60W 30/18* (2012.01)
(Continued)

(52) U.S. Cl.
CPC .... *B60W 30/143* (2013.01); *B60W 30/18163* (2013.01); *B60W 40/04* (2013.01);
(Continued)

(58) Field of Classification Search
CPC ......... B60W 30/143; B60W 30/18163; B60W 40/04; B60W 40/105; B60W 60/0013;
(Continued)

(56) References Cited

U.S. PATENT DOCUMENTS

2017/0017235 A1* 1/2017 Tanaka ................. G05D 1/0297
2017/0120909 A1* 5/2017 Oniwa ................. G05D 1/0212
(Continued)

FOREIGN PATENT DOCUMENTS

CN      110356404      10/2019
JP      2018-173728    8/2018
(Continued)

OTHER PUBLICATIONS

An_overview_on_control_algorithms_for_automated_highway_systems.pdf (Year: 1999).*

(Continued)

*Primary Examiner* — Thomas Ingram
*Assistant Examiner* — Faris Asim Shaikh
(74) *Attorney, Agent, or Firm* — AMIN, TUROCY & WATSON, LLP

(57) ABSTRACT

A vehicle control device configured to recognize a surrounding situation of a host vehicle, control at least a speed of the host vehicle based on the surrounding situation, determine a target relative position between two other vehicles in a state in which there is no vehicle in a second lane when the host vehicle is allowed to perform merge-point-related movement or a lane change from a first lane to the second lane, determine a target speed serving as a target when the host vehicle reaches the target relative position, and adjust the speed of the host vehicle according to pole-assignment control based on a position deviation that is a deviation between the target relative position and a position of the host vehicle in a road extension direction and a vehicle speed deviation that is a deviation between the speed of the host vehicle and the target speed.

9 Claims, 14 Drawing Sheets

(51) Int. Cl.
*B60W 40/105* (2012.01)
*B60W 60/00* (2020.01)
*B60W 40/04* (2006.01)

(52) U.S. Cl.
CPC ...... *B60W 40/105* (2013.01); *B60W 60/0013* (2020.02); *B60W 2554/80* (2020.02)

(58) Field of Classification Search
CPC ..... B60W 2554/80; B60W 2554/4029; B60W 60/001; B60W 2554/802; B60W 2554/804; B60W 2050/0001; B60W 2050/0043; B60W 2050/0037; B60W 2050/0028; B60W 2050/0019; Y10S 505/859; Y10S 505/86; Y10S 505/858; G05B 19/066; B60T 8/364
See application file for complete search history.

(56) References Cited

U.S. PATENT DOCUMENTS

| | | | |
|---|---|---|---|
| 2018/0093671 A1* | 4/2018 | Allan | G05D 1/0223 |
| 2018/0345968 A1 | 12/2018 | Yasui et al. | |
| 2019/0016338 A1* | 1/2019 | Ishioka | G08G 1/16 |
| 2019/0071098 A1* | 3/2019 | Asakura | B60W 50/14 |
| 2019/0179330 A1* | 6/2019 | Oniwa | G05D 1/02 |
| 2019/0244111 A1* | 8/2019 | Ruml | G06N 3/008 |
| 2020/0265710 A1* | 8/2020 | Zhan | G08G 1/0129 |
| 2020/0269841 A1* | 8/2020 | Gao | G08G 1/167 |
| 2020/0293291 A1* | 9/2020 | Guan | G06F 17/15 |
| 2021/0078575 A1* | 3/2021 | Machida | B60W 50/14 |
| 2021/0331672 A1* | 10/2021 | Eigel | B60W 30/18163 |
| 2022/0332348 A1* | 10/2022 | Liu | B60W 50/02 |

FOREIGN PATENT DOCUMENTS

| | | |
|---|---|---|
| JP | 2018-203017 | 12/2018 |
| JP | 2020-100244 | 7/2020 |
| WO | 2017/199750 | 11/2017 |

OTHER PUBLICATIONS

Autonomous_intelligent_cruise_control_using_a_novel_multiple-controller_framework.pdf (Year: 2008).*
Chinese Office Action for Chinese Patent Application No. 202111017725.8 dated Aug. 12, 2023.
Japanese Office Action for Japanese Patent Application No. 2020-148141 dated Oct. 24, 2023.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-148141, filed Sep. 3, 2020, the content of which is incorporated herein by reference.

BACKGROUND

Field of the Invention

The present invention relates to a vehicle control device, a vehicle control method, and a storage medium.

Description of Related Art

Conventionally, research and practical application of automated driving technology for causing a vehicle to travel automatedly have been promoted. As described in Patent Document 1 (Japanese Unexamined Patent Application, First Publication No. 2018-173728), merge-point-related movement to a main lane and a lane change are important themes in automated driving.

SUMMARY

When merge-point-related movement or a lane change is performed, it may be necessary to align a vertical position of a vehicle (a position in a road extension direction) with a target inter-vehicle position (a relative position). In the conventional technology, it may be difficult to adjust a speed smoothly when the vertical position is aligned.

The present invention has been made in consideration of the above circumstances and an objective of the present invention is to provide a vehicle control device, a vehicle control method, and a storage medium capable of performing smoother speed adjustment.

A vehicle control device, a vehicle control method, and a storage medium according to the present invention adopt the following configurations.

(1): According to an aspect of the present invention, there is provided a vehicle control device including: a storage device storing a program; and a hardware processor, wherein the hardware processor executes the program stored in the storage device to: recognize a surrounding situation of a host vehicle, control at least a speed of the host vehicle based on the surrounding situation, determine a target relative position between two other vehicles in a state in which there is no vehicle in a second lane when the host vehicle is allowed to perform merge-point-related movement or a lane change from a first lane to the second lane, determine a target speed serving as a target when the host vehicle reaches the target relative position, and adjust the speed of the host vehicle according to pole-assignment control based on a position deviation that is a deviation between the target relative position and a position of the host vehicle in a road extension direction and a vehicle speed deviation that is a deviation between the speed of the host vehicle and the target speed.

(2): In the above aspect (1), the hardware processor determines the target speed based on speeds of one or both of the two other vehicles in the state in which there is no vehicle in the second lane when the target speed is determined.

(3): In the above aspect (1), the hardware processor adjusts the speed of the host vehicle by determining a control input given to a speed adjustment device of the host vehicle so that a switching function in which the position deviation and the speed deviation are coupled linearly is approximated to zero and the position deviation and the speed deviation are approximated to zero.

(4): In the above aspect (3), the hardware processor determines the control input in addition to an equivalent control input for constraining the switching function to zero after the switching function becomes zero.

(5): In the above aspect (1), the hardware processor determines a correction quantity of the target speed so that a first switching function in which the position deviation and a previous value of the position deviation are coupled linearly is approximated to zero and the position deviation and the previous value of the position deviation are approximated to zero, the hardware processor determines the target speed by correcting a temporary target speed based on speeds of one or both of the two other vehicles by the correction quantity, and the hardware processor adjusts the speed of the host vehicle by determining a control input given to a speed adjustment device of the host vehicle so that a second switching function in which the speed deviation and a previous value of the speed deviation are coupled linearly is approximated to zero and the speed deviation and the previous value of the speed deviation are approximated to zero.

(6): In the above aspect (5), the hardware processor determines the control input in addition to an equivalent control input for constraining the switching function to zero after the switching function becomes zero, and the equivalent control input is determined based on the temporary target speed.

(7): In the above aspect (1), the hardware processor is able to execute a first mode in which the speed of the host vehicle is adjusted by determining a control input given to a speed adjustment device of the host vehicle so that a switching function in which the position deviation and the speed deviation are coupled linearly is approximated to zero and the position deviation and the speed deviation are approximated to zero and a second mode in which a correction quantity of the target speed is determined so that a first switching function in which the position deviation and a previous value of the position deviation are coupled linearly is approximated to zero and the position deviation and the previous value of the position deviation are approximated to zero, the target speed is determined by correcting a temporary target speed based on speeds of one or both of the two other vehicles by the correction quantity, and the speed of the host vehicle is adjusted by determining a control input given to a speed adjustment device of the host vehicle so that a second switching function in which the speed deviation and a previous value of the speed deviation are coupled linearly is approximated to zero and the speed deviation and the previous value of the speed deviation are approximated to zero, and the hardware processor adjusts the speed of the host vehicle by selecting one of the first mode and the second mode.

(8): In the above aspect (1), the hardware processor sets a guidance parameter in the pole-assignment control in accordance with a traveling environment of the host vehicle.

(9): According to another aspect of the present invention, there is provided a vehicle control method including: recognizing, by a hardware processor, a surrounding situation of a host vehicle; controlling, by the hardware processor, at least a speed of the host vehicle based on the surrounding situation; and determining, by the hardware processor, a target relative position between two other vehicles in a state in which there is no vehicle in a second lane when the host vehicle is allowed to perform merge-point-related movement or a lane change from a first lane to the second lane, determining a target speed serving as a target when the host vehicle reaches the target relative position, and adjusting the speed of the host vehicle according to pole-assignment control based on a position deviation that is a deviation between the target relative position and a position of the host vehicle in a road extension direction and a vehicle speed deviation that is a deviation between the speed of the host vehicle and the target speed.

(10): According to still another aspect of the present invention, there is provided a computer-readable non-transitory storage medium storing a program for causing a hardware processor to: recognize a surrounding situation of a host vehicle; control at least a speed of the host vehicle based on the surrounding situation; determine a target relative position between two other vehicles in a state in which there is no vehicle in a second lane when the host vehicle is allowed to perform merge-point-related movement or a lane change from a first lane to the second lane; determine a target speed serving as a target when the host vehicle reaches the target relative position; and adjust the speed of the host vehicle according to pole-assignment control based on a position deviation that is a deviation between the target relative position and a position of the host vehicle in a road extension direction and a vehicle speed deviation that is a deviation between the speed of the host vehicle and the target speed.

According to the above-described aspects (1) to (10), it is possible to perform smoother speed adjustment by recognizing a surrounding situation of a host vehicle, controlling a speed and steering of the host vehicle based on the surrounding situation, determining a target relative position between two other vehicles in a state in which there is no vehicle in a second lane when the host vehicle is allowed to perform merge-point-related movement or a lane change from a first lane to the second lane, determining a target speed serving as a target when the host vehicle reaches the target relative position, and adjusting the speed of the host vehicle according to pole-assignment control based on a position deviation that is a deviation between the target relative position and a position of the host vehicle in a road extension direction and a vehicle speed deviation that is a deviation between the speed of the host vehicle and the target speed.

DESCRIPTION OF EMBODIMENTS

Hereinafter, embodiments of a vehicle control device, a vehicle control method, and a storage medium of the present invention will be described with reference to the drawings.

Common Configuration of Embodiments

Figure 1:
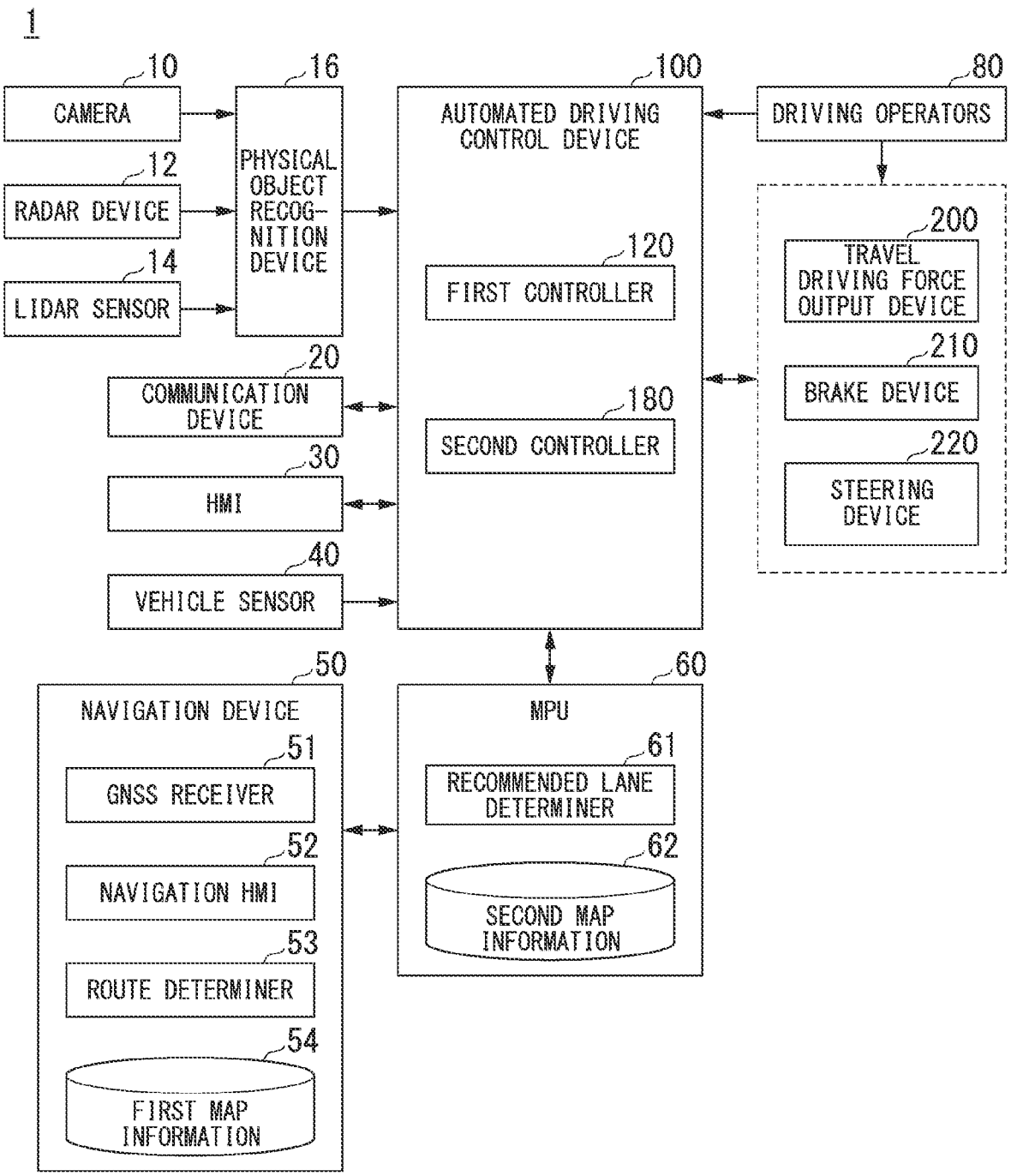
FIG. 1 is a configuration diagram of a vehicle system using a vehicle control device.

FIG. 1 is a configuration diagram of a vehicle system 1 using a vehicle control device. A vehicle (which may be hereinafter referred to as a host vehicle M) equipped with the vehicle system 1 is, for example, a vehicle such as a two-wheeled vehicle, a three-wheeled vehicle, or a four-wheeled vehicle. A driving source of these vehicles is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operators 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any position on the vehicle (hereinafter referred to as the host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and a speed of the physical object in a frequency modulated continuous wave (FM-CW) scheme.

The LIDAR sensor 14 radiates light (or electromagnetic waves of a wavelength close to an optical wavelength) to the vicinity of the host vehicle M and measures scattered light. The LIDAR sensor 14 detects a distance to an object based on a time period from light emission to light reception. The radiated light is, for example, pulsed laser light. The LIDAR sensor 14 is attached to any position on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation by the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M based on a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines what number lane the vehicle travels in from the left.

The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operators 80 include an accelerator pedal, a brake pedal, a shift lever, a steering wheel, a steering wheel variant, a joystick, and other operators. A sensor configured to detect an operation quantity or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120 and a second controller 180. Each of the first controller 120 and the second controller 180 is implemented, for example, by a hardware processor such as a central processing unit (CPU) executing a program (software). Some or all of the above components may be implemented by hardware (including a circuit: circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device.

The automated driving control device 100 is an example of a "vehicle control device."

Figure 2:
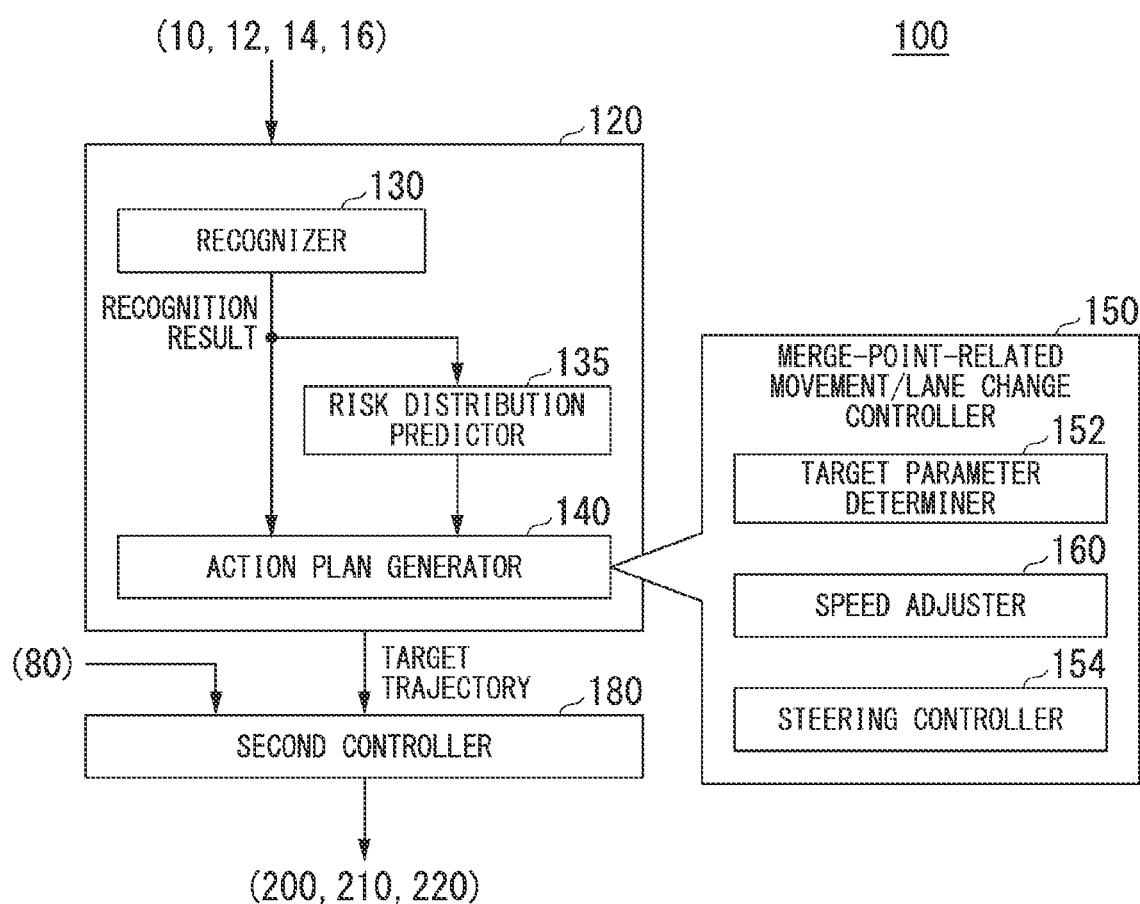
FIG. 2 is a functional configuration diagram of an automated driving control device.

FIG. 2 is a functional configuration diagram of the automated driving control device 100. The first controller 120 includes, for example, a recognizer 130, a risk distribution predictor 135, and an action plan generator 140. The action plan generator 140 includes a merge-point-related movement/lane change controller 150. A combination of the action plan generator 140 and the second controller is an example of a "driving controller."

For example, the first controller 120 predicts future actions of other traffic participants (vehicles, pedestrians, bicycles, and the like which can be moving physical objects), expresses a future position as a risk (to be described below) based on current positions of the traffic participants, expresses an area where traveling is impossible in the risk, and further determines the future action of the host vehicle M according to a sequential optimization algorithm so that the risk is minimized.

The recognizer 130 recognizes states of positions, speeds, acceleration, and the like of physical objects near the host vehicle M based on information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize the travel lane by recognizing a traveling path boundary including a road dividing line, a road shoulder, a curb stone, a median strip, a guardrail, or the like as well as a road dividing line. In this recognition, a position of the host vehicle M acquired from the navigation device 50 or a processing result of the INS may be added. The recognizer 130 may recognize a temporary stop line, an obstacle, red traffic light, a toll gate, and other road events.

When the travel lane is recognized, the recognizer 130 recognizes a relative position or orientation of the host vehicle M with respect to the travel lane. For example, the recognizer 130 may recognize a gap of a reference point of the host vehicle M from the center of the lane and an angle formed by a line connected to the center of the lane in a traveling direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The risk distribution predictor 135 sets a risk having an index value indicating a degree to which the host vehicle M should not enter or access an assumed plane S obtained by representing a space near the host vehicle M in a two-dimensional plane viewed from above. It is assumed that the risk indicates that the host vehicle M should not enter or access the assumed plane S when the value is larger and that it is more preferable that the host vehicle M travels when the value is closer to 0.

However, the above relationship may be reversed.

The risk distribution predictor 135 sets risks on the assumed plane S for future time points defined not only at the present time but also at regular time intervals such as at the present time t, after $\Delta t$ (time $t+\Delta t$), and after $2\Delta t$ (time $t+2\Delta t$). The risk distribution predictor 135 predicts the risk at each future time point based on a change in a position of a mobile object that is continuously recognized by the recognizer 130.

Figure 3:
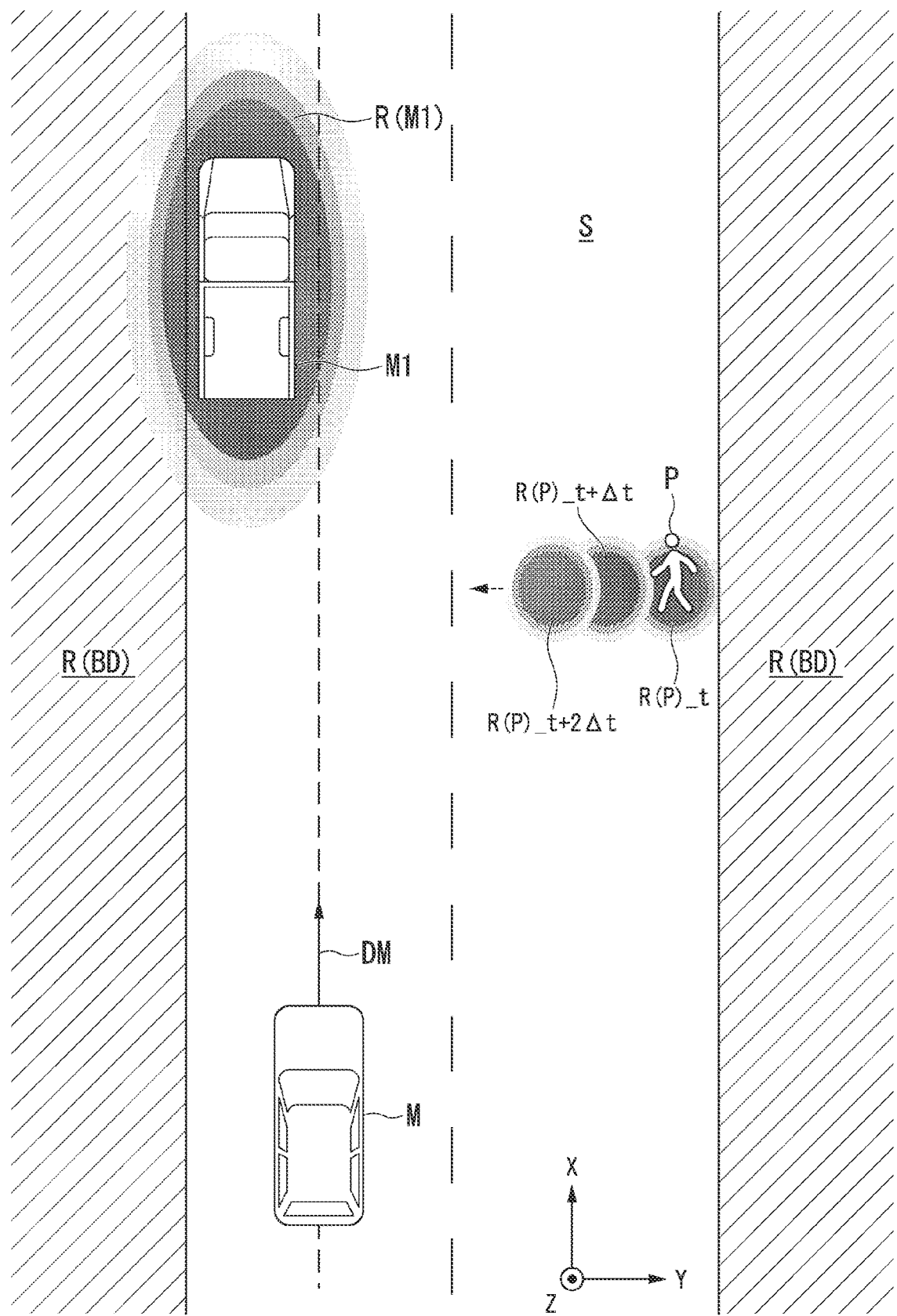
FIG. 3 is a diagram showing an outline of risks set by a risk distribution predictor.

FIG. 3 is a diagram showing an outline of a risk set by the risk distribution predictor 135. The risk distribution predictor 135 sets a risk in which an ellipse or a circle based on a traveling direction and a speed is a contour line on the assumed plane S with respect to traffic participants (mobile objects) such as vehicles, pedestrians, and bicycles and sets a risk of a specified value for an area where traveling is impossible. In FIG. 3, DM denotes the traveling direction of the host vehicle M. R(M1) denotes a risk of a stopped vehicle M1 and R(P) denotes a risk of a pedestrian P. Because the pedestrian P is moving across a road, the risk is set at a position of each future time point different from that of the present time point. The same is also true for moving vehicles, bicycles, and the like. R(BD) denotes a risk of an area BD where traveling is impossible. In FIG. 3, a density of hatching indicates a risk value and the risk is higher when the hatching is darker. The risk distribution predictor 135 may set the risk so that the value increases as the distance from the center of the lane increases.

The action plan generator 140 generates a future target trajectory along which the host vehicle M automatedly travels (independently of a driver's operation) so that the host vehicle M can generally travel in the recommended lane determined by the recommended lane determiner 61 and pass through an area of a low risk set by the risk distribution predictor 135. For example, the target trajectory includes a speed element. For example, the target trajectory is represented by sequentially arranging points (trajectory points) at which the host vehicle M is required to arrive. The trajectory points are points at which the host vehicle M is required to arrive for each predetermined traveling distance (for example, about several meters [m]) along a road. In addition, a target speed and target acceleration for each predetermined sampling time (for example, about several tenths of a second [sec]) are generated as parts of the target trajectory. The trajectory point may be a position at which the host vehicle M is required to arrive at the sampling time for each predetermined sampling time. In this case, information about the target speed or the target acceleration is represented by an interval between the trajectory points. The action plan generator 140 generates a plurality of target trajectory candidates, calculates scores based on the viewpoints of efficiency and safety, and selects a target trajectory candidate having good scores as the target trajectory. The first controller 120 outputs the target trajectory to the second controller 180.

When the host vehicle M performs merge-point-related movement from a branch lane to a main lane and when the host vehicle M makes a lane change to another lane, the merge-point-related movement/lane change controller 150 controls the traveling of the host vehicle M based on a standard different from the above-described risk. In this case, a target trajectory based on the above-described risk may not be referred to or may be mixed with a control instruction from the merge-point-related movement/lane change controller 150 and used for control. The mergepoint-related movement/lane change controller 150 may perform control to be described below only when the host vehicle M performs merge-point-related movement from a branch lane to a main lane or may perform control to be described below only when the host vehicle M makes a lane change to another lane. Although only a process of merge-point-related movement time will be described below for the sake of simplicity, the merge-point-related movement is the same as the lane change in principle (except for content of a process of the guidance parameter setter 168A).

The merge-point-related movement/lane change controller 150 includes a target parameter determiner 152, a speed adjuster 160, and a steering controller 154.

Figure 4:
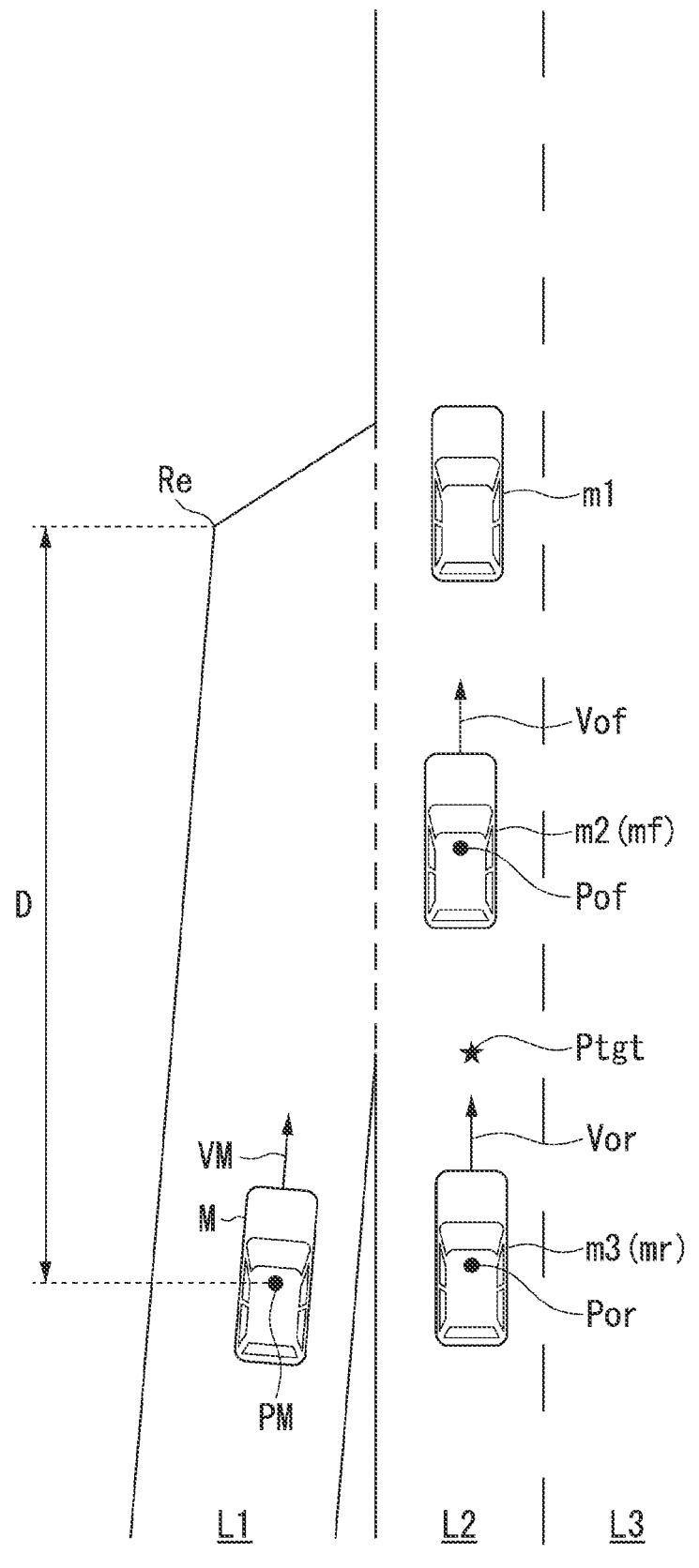
FIG. 4 is a diagram for describing the function of the merge-point-related movement/lane change controller.

FIG. 4 is a diagram for describing a function of the merge-point-related movement/lane change controller 150. In FIG. 4, an arrow indicates a speed vector of each vehicle. The target parameter determiner 152 determines a target relative position Ptgt and a target relative speed Vmt. When merge-point-related movement or a lane change from a first lane L1 to a second lane L2 is performed, the target parameter determiner 152 determines a target relative position of an area (hereinafter referred to as a target area) between two other vehicles (hereinafter referred to as a front reference vehicle mf and a rear reference vehicle mr) in a state in which there is no vehicle in the second lane L2. A set of the front reference vehicle mf and the rear reference vehicle mr may be selectable from one or more candidates. For example, the target parameter determiner 152 may calculate a score based on a traveling distance to a merge point, required acceleration/deceleration, an inter-vehicle distance between the front reference vehicle mf and the rear reference vehicle mr, and the like, select the set of the front reference vehicle mf and the rear reference vehicle mr according to comprehensive evaluation, simply select the set of the front reference vehicle mf and the rear reference vehicle mr whose area serving as a target area is closest to the host vehicle M, or switch a selection method between the above selection methods according to a situation. Because the method of selecting the set of the front reference vehicle mf and the rear reference vehicle mr is not a core part of the present invention, further description thereof will be omitted. In the example of FIG. 4, it is assumed that a vehicle m2 among the other vehicles is selected as the front reference vehicle mf and a vehicle m3 is selected as the rear reference vehicle mr.

When the set of the front reference vehicle mf and the rear reference vehicle mr is selected, the target parameter determiner 152 determines, for example, the target relative position Ptgt based on positions of a representative point Pof of the front reference vehicle mf and a representative point Por of the rear reference vehicle mr. The "representative point" can be arbitrarily defined as the center of gravity of the vehicle, the center of the drive shaft, the center of the front end, the center of the rear end, or the like. The definition may differ according to the vehicle as in a case in which the representative point of the front reference vehicle mf is the center of the rear end and the representative point of the rear reference vehicle mr is the center of the front end. In the example of FIG. 4, the representative point is assumed to be the center of gravity. The representative point PM of the host vehicle M is similarly assumed to be the center of gravity. For example, the target parameter determiner 152 determines an intermediate position between the representative point Pof of the front reference vehicle mf and the representative point Por of the rear reference vehicle mr as the target relative position Ptgt. Alternatively, the target parameter determiner 152 may determine a position shifted forward a predetermined quantity (or a predetermined ratio) from the above intermediate position as the target relative position Ptgt or may determine a position shifted rearward a predetermined quantity from the representative point Pof of the front reference vehicle mf as the target relative position Ptgt. The target relative position Ptgt is not a position that is fixedly determined with respect to the point, but is a relative position that moves as the front reference vehicle mf and the rear reference vehicle mr move due to an iterated determination process.

The target speed Vtgt is a speed having a target value of the speed VM of the host vehicle M when the host vehicle M reaches the target relative position Ptgt. For example, the target parameter determiner 152 determines the speed Vof of the front reference vehicle mf as the target speed Vtgt. Alternatively, the target parameter determiner 152 may determine an intermediate value, a weighted sum, or the like of the speed Vof of the front reference vehicle mf and the speed Vor of the rear reference vehicle mr as the target speed Vtgt or may select one of the speed Vof of the front reference vehicle mf and the speed Vor of the rear reference vehicle mr to determine the selected speed as the target speed Vtgt. The speed VM of the host vehicle M may have an angle with respect to the extending direction of the second lane L2. In this case, a speed obtained by projecting the measured speed of the host vehicle M in an extension direction of the second lane L2 may be set as the speed VM of the host vehicle M or the measured speed of the host vehicle M may be set as the speed VM of the host vehicle M as it is.

The speed adjuster 160 adjusts the speed of the host vehicle M until the host vehicle M reaches the target relative position Ptgt. Details of the function of the speed adjuster 160 will be described with reference to the drawings for each embodiment.

The steering controller 154 starts automated steering when the host vehicle M sufficiently approaches the target relative position Ptgt in a road extension direction (for example, when the host vehicle M is within a predetermined distance) and causes the host vehicle M to move to the lane L2. Because content of a process of the steering controller 154 is not a core part of the present invention, further description thereof will be omitted.

The second controller 180 controls the travel driving force output device 200, the brake device 210, and the steering device 220 so that the host vehicle M passes along a target trajectory generated by the first controller 120 at a scheduled time that has been defined. "Speed adjustment device" refers to one or both of the travel driving force output device 200 and the brake device 210. The second controller 180 performs a process of stopping the automated driving by the first controller 120 and switching driving to the manual driving when the driving operator 80 is operated with an operation quantity larger than a reference or the like.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 180 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 180 or the information input from the driving operator 80 so that brake torque according to a braking operation is output to each wheel. The brake device 210 may include a mechanism configured to transfer the hydraulic pressure generated by an operation of the brake pedal included in the driving operator 80 to the cylinder via a master cylinder as a backup. The brake device 210 is not limited to the above-described configuration and may be an electronically controlled hydraulic brake device configured to control an actuator in accordance with information input from the second controller 180 and transfer the hydraulic pressure of the master cylinder to the cylinder.

For example, the steering device 220 includes a steering ECU and an electric motor.

For example, the electric motor changes a direction of steerable wheels by applying a force to a rack and pinion mechanism. The steering ECU drives the electric motor in accordance with the information input from the second controller 180 or the information input from the driving operator 80 to change the direction of the steerable wheels.

First Embodiment

Hereinafter, the speed adjuster 160 of a first embodiment will be described. As will be described below, the speed adjuster 160 of the first embodiment adjusts a speed when merge-point-related movement or a lane change is performed according to pole-assignment control using a single-phase plane.

Figure 5:
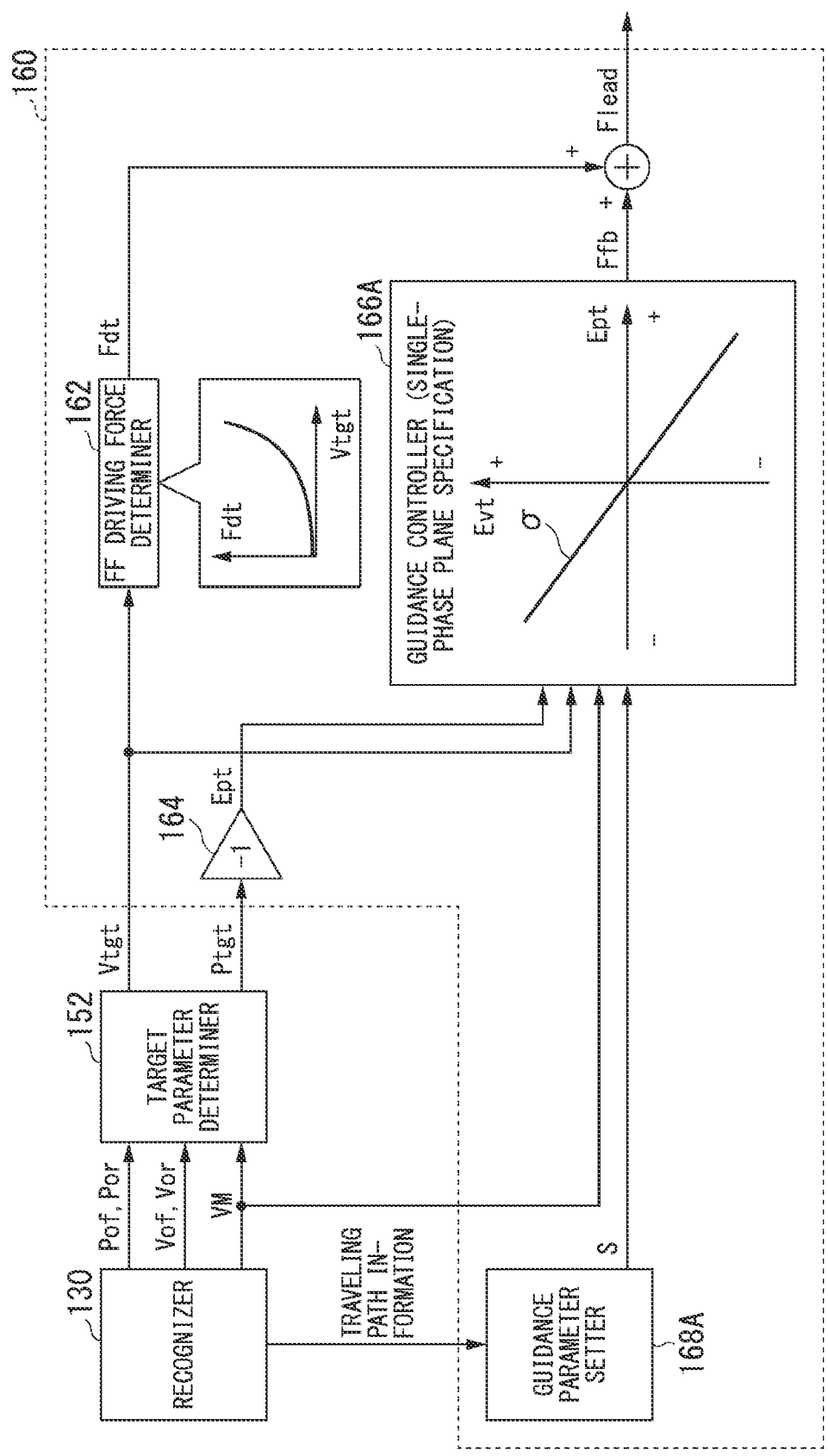
FIG. 5 is a functional configuration diagram of a speed adjuster of a first embodiment.

FIG. 5 is a functional configuration diagram of the speed adjuster 160 of the first embodiment. The speed adjuster 160 includes, for example, a feedforward (FF) driving force determiner 162, a multiplier 164, a guidance controller 166A, and a guidance parameter setter 168A. The recognizer 130 outputs the position Pof of the front reference vehicle mf, the position Por of the rear reference vehicle mr, the speed Vof of the front reference vehicle mf, the speed Vor of the rear reference vehicle mr, and the speed VM of the host vehicle M to the target parameter determiner 152. Based on the above information, the target parameter determiner 152 determines the target relative position Ptgt and the target speed Vtgt as described above.

The FF driving force determiner 162 determines a feedforward driving force Fdt required for traveling at the target speed Vtgt in consideration of traveling resistance. For example, the FF driving force determiner 162 determines the feedforward driving force Fdt by applying the target speed Vtgt input from the target parameter determiner 152 to corresponding information which is a table or a map in which a required feedforward driving force Fdt is associated with the target speed Vtgt. The FF driving force determiner 162 determines the feedforward driving force Fdt so that the feedforward driving force Fdt increases as the target speed Vtgt increases and a change ratio of the feedforward driving force Fdt to an increasing quantity of the target speed Vtgt increases as the target speed Vtgt increases.

The multiplier 164 calculates a position deviation Ept by multiplying the target relative position Ptgt by a coefficient such as −1. Originally, the position deviation is obtained by multiplying by −1 as described above if the target relative position Ptgt is determined based on the representative point PM of the host vehicle M.

The guidance controller 166 first calculates a speed deviation Evt by subtracting the target speed Vtgt from the speed VM of the host vehicle M (Eq. (1)). In Eq. (1), k denotes a control cycle. A process of the first controller 120 including the speed adjuster 160 is iteratively executed at a predetermined cycle and k denotes a parameter indicating a number of a process which is being iteratively performed. In the description of the first embodiment, the notation of "(k)" is omitted.

$$Evt(k) = VM(k) - Vtgt(k) \quad (1)$$

The guidance controller 166A calculates a guidance feedback driving force Ffb according to pole-assignment control (for example, sliding mode control, backstepping control, or the like) based on the position deviation Ept and the speed deviation Evt and controls the speed of the host vehicle M according to the calculated guidance feedback driving force Ffb. The guidance controller 166A calculates the guidance feedback driving force Ffb so that a switching function 6 in which the position deviation Ept and the speed deviation Evt are coupled linearly is approximated to zero and the position deviation Ept and the speed deviation Evt are approximated to zero (for example, approximated to zero by exponential attenuation). The switching function 6 is represented by Eq. (2). In Eq. (2), S denotes a guidance parameter and is set to a value greater than zero and less than one. There is a property that the convergence of the position deviation Ept to zero is faster (i.e., the host vehicle M more quickly reaches the vicinity of the target relative position Ptgt) when the value of the guidance parameter S is larger, but the acceleration/deceleration for causing the speed deviation Evt to be approximated to zero also increases immediately before the target relative position Ptgt is reached. When the guidance parameter S is large, the slope of the switching function 6 in the phase plane shown in FIG. 5 (a plane having axes representing the position deviation Ept and the speed deviation Evt) becomes close to vertical. This means that the speed deviation Evt is allowed to have a large value to a certain extent at a time point when the position deviation Ept and the speed deviation Evt become close to zero. The method of setting the guidance parameter S based on a traveling environment of the host vehicle M will be described below. The guidance feedback driving force Ffb is added to the feedforward driving force Fdt and is given to the speed adjustment device of the host vehicle M as a control input Flead. More specifically, the control input Flead is output to the second controller 180 and the second controller 180 controls the travel driving force output device 200 and/or the brake device 210 based on the control input Head.

$$\sigma(k) = Ept(k) + S(k)Evt(k) \quad (2)$$

The guidance controller 166A calculates the guidance feedback driving force Ffb based on, for example, Eqs. (3) to (6). In Eqs. (3) to (6), Ffb_rch denotes an arrival rule input, Ffb_adp denotes an adaptation rule input, Ffb_eq denotes an equivalent control input, M denotes a vehicle weight of the host vehicle M, and Krch and Kadp each denote feedback gains. The equivalent control input Ffb_eq is a term that acts to constrain the switching function σ to zero after the switching function σ becomes zero (in other words, constrain the position deviation Ept and the speed deviation Evt to a control line where the switching function σ is zero). By taking the equivalent control input Ffb_eq into account, an overall feedback gain of the controller can be increased and faster merge-point-related movement can be implemented as a result. The non-guidance execution time is the time when the manual driving is performed.

$$Ffb\_rch(k)=Krch\cdot\sigma(k) \quad (3)$$

$$Ffb\_adp(k)=Ffb\_adp(k-1)+Kadp\cdot\sigma(k)\text{(guidance execution time) or}$$

$$Ffb\_adp(k)=-Krch\cdot\sigma(k)\text{(non-guidance execution time)} \quad (4)$$

$$Ffb\_eq(k)=-M\cdot Evt(k)/S(k) \quad (5)$$

$$Ffb(k)=Ffb\_rch(k)+Ffb\_adp(k)+Ffb\_eq(k) \quad (6)$$

The guidance parameter setter 168A acquires traveling path information from the recognizer 130. The traveling path information includes a distance (an available merge-point-related movement distance) D from the position of the host vehicle M to a disappearance position Re of the lane L1 (see FIG. 4). The guidance parameter setter 168A sets the guidance parameter S so that the guidance parameter S decreases as the distance D increases and the guidance parameter S increases as the distance D decreases. Thereby, when the remaining distance to the merge point is short, the position deviation Ept can be preferentially set to zero and quick merge-point-related movement can be implemented. On the other hand, when the distance D is sufficiently long, the guidance parameter S is reduced and merge-point-related movement control with priority on ride comfort is performed in a state in which acceleration/deceleration is limited. In the case of the lane change instead of the merge-point-related movement, in principle, the disappearance position Re of the first lane does not exist, and therefore D is set to a sufficiently large value and the guidance parameter S is set to a sufficiently small value.

Figure 6:
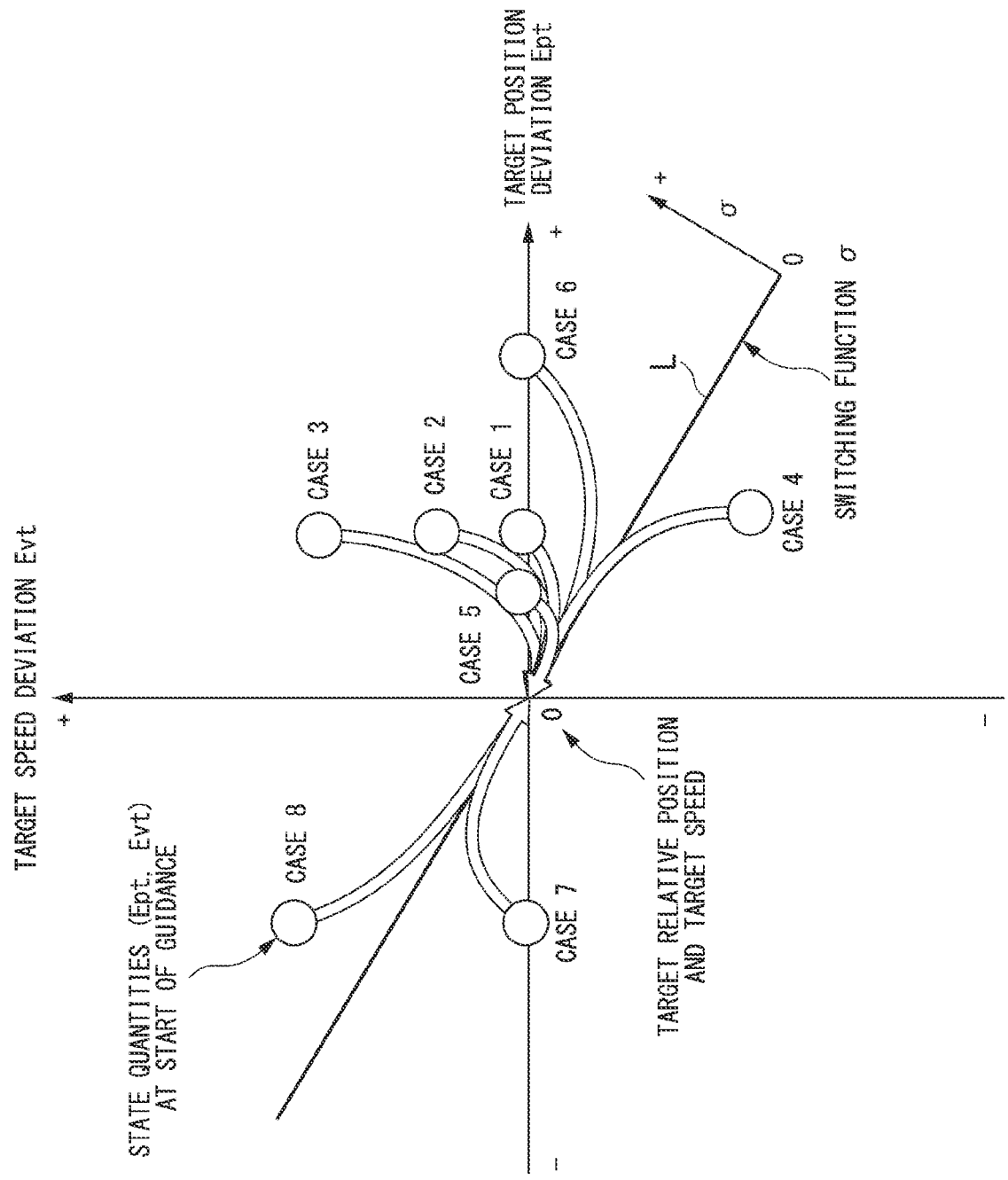
FIG. 6 is a diagram showing a state in which a position deviation Ept and a speed deviation Evt converge to zero according to pole-assignment control for various cases that are assumed.

By calculating the guidance feedback driving force Ffb as described above, the position deviation Ept and the speed deviation Evt can be approximated to zero at substantially the same time. FIG. 6 is a diagram showing a state in which the position deviation Ept and the speed deviation Evt converge to zero according to pole-assignment control with respect to various cases that are assumed. Case 1 is a case in which the speed VM of the host vehicle M is substantially the same as the speed Vof of the front reference vehicle mf and the speed Vor of the rear reference vehicle mr (a relative speed is substantially zero) and the host vehicle M is located slightly in front of the target relative position Ptgt. Case 2 is a case in which the speed VM of the host vehicle M is slightly faster than the speed Vof of the front reference vehicle mf and the speed Vor of the rear reference vehicle mr and the host vehicle M is located slightly in front of the target relative position Ptgt. Case 3 is a case in which the speed VM of the host vehicle M is excessively faster than the speed Vof of the front reference vehicle mf and the speed Vor of the rear reference vehicle mr and the host vehicle M is located slightly in front of the target relative position Ptgt. Case 4 is a case in which the speed VM of the host vehicle M is excessively slower than the speed Vof of the front reference vehicle mf and the speed Vor of the rear reference vehicle mr and the host vehicle M is located slightly in front of the target relative position Ptgt. Case 5, which is substantially the same as Case 1, is a case in which the speed VM of the host vehicle M is substantially the same as the speed Vof of the front reference vehicle mf and the speed Vor of the rear reference vehicle mr (a relative speed is substantially zero) and the host vehicle M is located slightly in front of the target relative position Ptgt. Case 6 is case in which the speed VM of the host vehicle M is substantially the same as the speed Vof of the front reference vehicle mf and the speed Vor of the rear reference vehicle mr (a relative speed is substantially zero) and the host vehicle M is located significantly in front of the target relative position Ptgt. Case 7 in which a case in which the speed VM of the host vehicle M is substantially the same as the speed Vof of the front reference vehicle mf and the speed Vor of the rear reference vehicle mr (a relative speed is substantially zero) and the host vehicle M is located significantly behind the target relative position Ptgt. Case 8 is a case in which the speed VM of the host vehicle M is excessively faster than the speed Vof of the front reference vehicle mf and the speed Vor of the rear reference vehicle mr and the host vehicle M is located significantly behind the target relative position Ptgt. In any case, the switching function 6 can be approximated to zero and the position deviation Ept and the speed deviation Evt can be finally approximated to zero along a control line with the switching function 6 which is zero.

According to the above control, the automated driving control device 100 can perform smoother speed adjustment. In the conventional feedback control represented by PID control, only one target close to the target value can be selected. On the other hand, in the automated driving control device 100 of the embodiment, the position deviation Ept and the speed deviation Evt can be approximated to zero at substantially the same time by the pole-assignment control, so that the speed VM of the host vehicle M is adjusted to a speed equivalent to that of the front reference vehicle mf or the like at a point in time when the host vehicle M reaches the vicinity of the target relative position Ptgt. Thus, sudden acceleration/deceleration is limited immediately before the merge-point-related movement and the merge-point-related movement is performed in behavior that feels natural to the occupants.

According to the first embodiment described above, smoother speed adjustment can be performed.

Second Embodiment

Hereinafter, a second embodiment will be described. The automated driving control device 100 of the second embodiment is similar to the first embodiment, except that a function of a guidance controller is different from that of the first embodiment. Therefore, the above difference will be mainly described. In the second embodiment, a control cycle will be described without omitting it.

Figure 7:
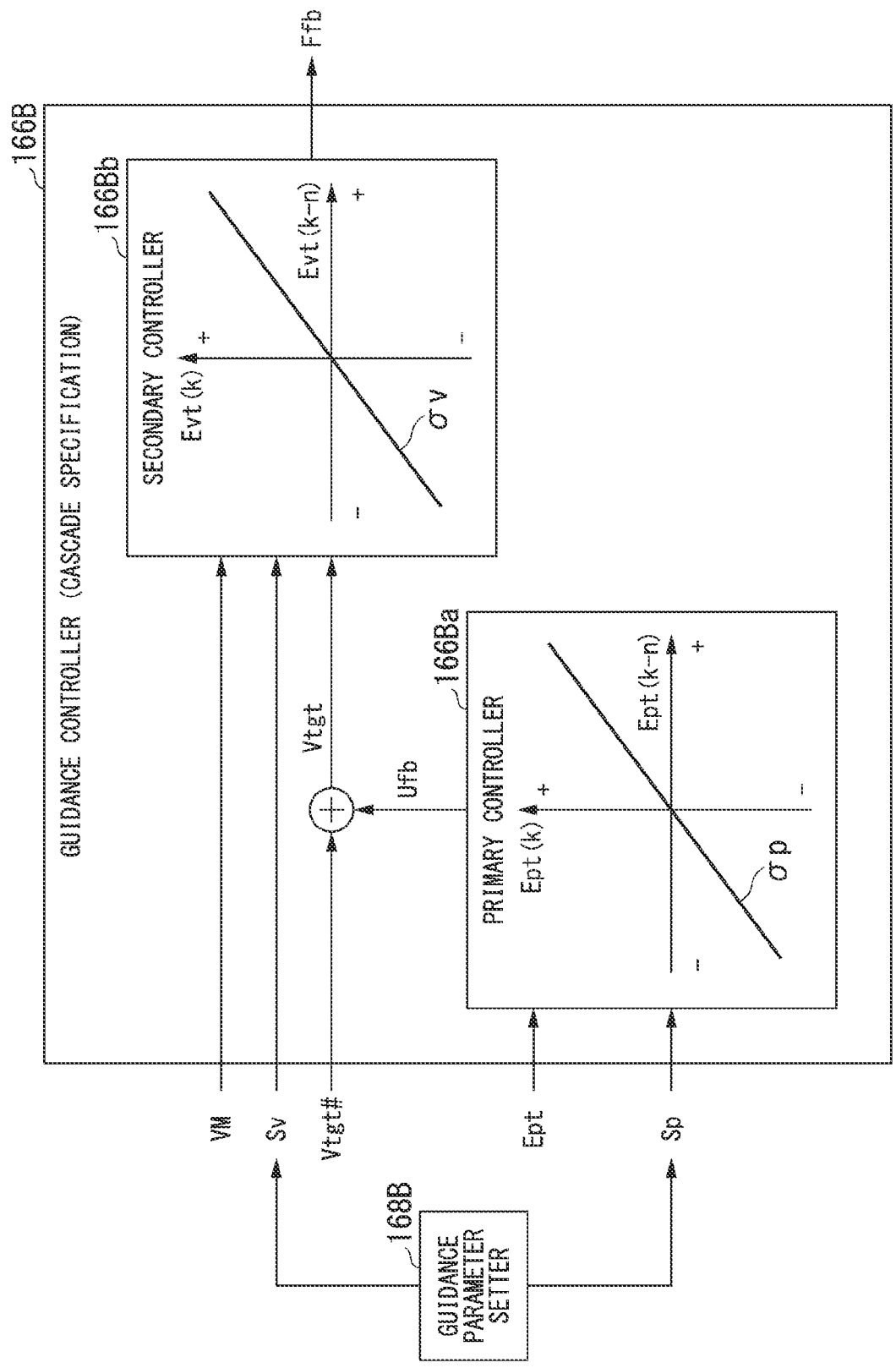
FIG. 7 is a diagram schematically showing functions of a guidance controller and a guidance parameter setter of a second embodiment.

FIG. 7 is a diagram schematically showing functions of a guidance controller 166B and a guidance parameter setter 168B of the second embodiment. The guidance controller 166B includes a primary controller 166Ba and a secondary controller 166Bb. The primary controller 166Ba functions as a position control controller and the secondary controller 166Bb functions as a speed control controller.

The primary controller 166Ba determines a correction quantity Ufb of a target speed Vtgt so that a first switching function σp(k) in which a position deviation Ept(k) and a previous value Ept(k−n) of the position deviation are coupled linearly is approximated to zero and the position deviation Ept(k) and the previous value Ept(k−n) of the position deviation are approximated to zero. n is a natural number. Accordingly, Ept(k−n) denotes a value of a $(k-n)^{th}$ cycle. The first switching function σp(k) is represented by Eq. (7). Sp(k) denotes a first guidance parameter and is set in a range of −1<Sp(k)<0.

$$\sigma p(k)=Ept(k)+Sp(k)\cdot Ept(k-n) \quad (7)$$

The primary controller 166Ba calculates the correction quantity Ufb based on, for example, Eqs. (8) to (10). In Eqs. (8) to (10), Urch(k) denotes an arrival rule input for position control, Uadp(k) denotes an adaptation rule input for position control, and Krch_p and Kadp_p denote feedback gains, respectively.

$$Urch(k)=Krch\_p \cdot \sigma p(k) \tag{8}$$

$$Uadp(k)=Kadp\_p \cdot \sigma p(k)+Uadp(k-1) \tag{9}$$

$$Ufb(k)=Urch(k)+Uadp(k) \tag{10}$$

The guidance controller 166B determines the target speed Vtgt by correcting a temporary target speed Vtgt #based on one or both of the speed Vof of the front reference vehicle mf and the speed Vor of the rear reference vehicle mr with the correction quantity Ufb(k). The speed deviation Evt(k) in the second embodiment is a difference between the corrected target speed Vtgt and the speed VM.

The secondary controller 166Bb calculates a guidance feedback driving force Ffb(k) so that a second switching function σv(k) in which the speed deviation Evt(k) and the previous value Evt(k−m) of the speed deviation are coupled linearly is approximated to zero and the speed deviation Evt(k) and the previous value Evt(k−m) of the speed deviation are approximated to zero. m is a natural number. Accordingly, Evt(k−m) denotes a value of a $(k-m)^{th}$ cycle. The second switching function σv(k) is represented by Eq. (11). Sv(k) denotes a second guidance parameter and is set in a range of −1<Sv(k)<0. Here, n and m may be set to the same value, but the convergence speed of the speed control can be adjusted to be faster than the convergence speed of the position control by setting n>m.

$$\sigma v(k)=Evt(k)+Sv(k) \cdot Evt(k-m) \tag{11}$$

The secondary controller 166Bb calculates the guidance feedback driving force Ffb based on, for example, Eqs. (12) to (14). In Eqs. (12) to (14), Frch(k) denotes an arrival rule input for speed control, Fadp(k) denotes an adaptation rule input for speed control, and Krch_v and Kadp_v denote feedback gains, respectively.

$$Frch(k)=Krch\_v \cdot \sigma v(k) \tag{12}$$

$$Fadp(k)=Kadp\_v \cdot \sigma v(k)+Fadp(k-1)\text{(guidance execution time) or}$$

$$Fadp(k)=-Fdrv(k)-Fff(k)-Ffb(k)\text{(non-guidance execution time)} \tag{13}$$

$$Ffb(k)=Frch(k)+Fadp(k) \tag{14}$$

The guidance feedback driving force Ffb is added to the feedforward driving force Fdt and a sum of Ffb and Fdt is given to a speed adjustment device of the host vehicle M as a control input Flead. Although the position deviation Ept and the speed deviation Evt can be approximated to zero substantially at the same time as in the first embodiment by calculating the guidance feedback driving force Ffb as described above, a process of approximating the position deviation Ept to zero is implemented to be slightly faster than that of the first embodiment and the speed deviation Evt remains a little at that point in time as a result. Thus, the host vehicle M can reach the vicinity of the target relative position Ptgt more quickly than in the first embodiment, but the acceleration/deceleration felt by the occupant becomes large. Because the second embodiment has a property that the control does not oscillate even if the feedback gain is made larger than that of the first embodiment, the host vehicle M can similarly be allowed to reach the vicinity of the target relative position Ptgt more quickly than in the first embodiment thereby.

The guidance parameter setter 168B sets at least the first guidance parameter Sp(k) based on a traveling environment of the host vehicle M. For example, the guidance parameter setter 168B acquires the traveling path information from the recognizer 130 as in the first embodiment and sets the first lead parameter Sp(k) so that an absolute value of the first guidance parameter Sp(k) is larger when the distance D included in the traveling path information is longer and the absolute value of the first guidance parameter Sp(k) is smaller when the distance D included in the traveling path information is shorter. Thereby, when the remaining distance to the merge point is short, the position deviation Ept(k) can be preferentially set to zero and quick merge-point-related movement can be implemented. On the other hand, when the distance D is sufficiently long, the absolute value of the first guidance parameter Sp(k) is increased and merge-point-related movement control with priority on ride comfort is performed in a state in which acceleration/deceleration is limited.

The guidance parameter setter 168B may set the second guidance parameter Sv(k) to a fixed value or may set the second guidance parameter Sv(k) to a variable value that varies with a change in the first guidance parameter Sp(k).

Based on the method of the guidance controller 166B of the second embodiment, manual driving guidance by sound may be performed instead of automated driving. In this case, different notification sounds may be output from the speaker when the host vehicle M requires acceleration and when the host vehicle M requires deceleration so that the host vehicle M is aligned with the target relative position Ptgt in a road extension direction. In this case, volumes of the notification sounds may be different when acceleration is required and when deceleration is required and a notification sound interval may be different in accordance with a speed change level of the host vehicle M required for performing alignment. The notification sound may be determined based on the guidance feedback driving force Ffb derived by the guidance controller 166B and the determined notification sound may be output from the speaker.

According to the second embodiment described above, smoother speed adjustment can be performed and control can be performed with priority given to alignment as compared with the first embodiment.

Modified Examples of Second Embodiment

In the second embodiment, the secondary controller 166Bb may perform control using an equivalent control input. It is assumed that the function of the primary controller 166Ba is similar to that of the second embodiment. The secondary controller 166Bb in the modified example of the second embodiment calculates the guidance feedback driving force Ffb based on, for example, the above-described Eqs. (12), (13), and (15). Frch(k) in Eq. (15) denotes an arrival rule input for speed control, Fadp(k) denotes an adaptation rule input for speed control, and Feq(k) denotes an equivalent control input. The equivalent control input Feq(k) is represented by Eq. (16) using the temporary target speed Vtgt #. The equivalent control input Feq(k) is a term that acts to constrain the switching function σv(k) to zero after the switching function σv(k) becomes zero (in other words, constrain the speed deviation Evt(k−m) and the speed deviation Evt(k) to the control line where the switching function σv(k) is zero). By taking the equivalent control input Feq(k) into account, the feedback gain can be increased and faster merge-point-related movement can be implemented as a result. M in Eq. (16) denotes a vehicle weight of the host vehicle M and ΔT denotes a control cycle (for example, from about several tens milliseconds [ms] to several hundreds milliseconds [ms]).

$$Ffb(k)=Frch(k)+Fadp(k)+Feq(k) \quad (15)$$

$$Feq(k)=(M/\Delta T)\times\{-Sv(k)\times VM(k)+Sv(k)\times VM(k-1)\}+ \\ (Sv(k)+1)\times Vtgt\#(k)-(Sv(k)+1)\times Vtgt\#(k-1)\} \quad (16)$$

A principle of determining the equivalent control input Feq(k) as described above will be described. In Feq(k), in principle, a future target speed Vtgt(k+1) of the next control cycle is required. However, because the future target speed Vtgt(k+1) cannot be calculated, it is necessary to delay the target speed Vtgt for use in the calculation of the speed deviation Evt(k) and the calculation of the equivalent control input Feq(k) by one control cycle. Ideally, the target speed Vtgt for use in the calculation of the equivalent control input Feq(k) should be a target speed Vtgt whose temporary target speed Vtgt #has been corrected by the primary controller 166Ba with the correction quantity Ufb(k).

When the equivalent control input Feq(k) is determined using the target speed Vtgt(k+1) of the next control cycle, the equivalent control input Feq(k) is represented by Eq. (18) on the premise of Eq. (17). When the control cycle is shifted to the previous control cycle so that the target speed Vtgt(k+1) of the next control cycle is eliminated from Eq. (18), Eq. (19) is obtained.

$$Evt(k)=VM(k)-Vtgt(k-1) \quad (17)$$

$$Feq(k)=(M/\Delta T)\times\{-Sv(k)\times VM(k)+Sv(k)\times VM(k-1)\}+ \\ Vtgt(k+1)+(Sv(k)-1)\times Vtgt(k)-Sv(k)\times Vtgt(k-1)\} \quad (18)$$

$$Feq(k)=(M/\Delta T)\times\{-Sv(k)\times VM(k)+Sv(k)\times VM(k-1)\}+ \\ Vtgt(k)+(Sv(k)-1)\times Vtgt(k-1)-Sv(k)\times Vtgt(k-2)\} \quad (19)$$

However, when merge-point-related movement control is performed using the equivalent control input Feq(k) obtained by Eq. (19), the primary controller 166Ba and the secondary controller 166Bb resonate due to an influence of a change in an action force of the feedforward control by the delay of the speed target value Vtgt and the equivalent control input Feq(k) and position and speed control diverges.

Consequently, on the premise of Eq. (20) in which one control cycle delay of the target speed Vtgt is eliminated when the speed deviation Evt(k) is calculated, a target speed is set as a future target speed using the predicted value Vtgt #(k+1) of the temporary target speed Vtgt #described above and the equivalent control input Feq(k) is determined by Eq. (21).

$$Evt(k)=VM(k)-Vtgt(k) \quad (20)$$

$$Feq(k)=(M/\Delta T)\times-\{Sv(k)\times VM(k)+Sv(k)\times VM(k-1)\}+ \\ Vtgt\#(k+1)+(Sv(k)-1)\times Vtgt\#(k-2)-Sv(k)\times Vtgt\# \\ (k-3)\} \quad (21)$$

Here, if the predicted value Vtgt #(k+1) of the temporary target speed Vtgt #is defined as ΔVtgt #(k)=Vtgt #(k)−Vtgt #(k−1), this can be represented by Vtgt #(k)+ΔVtgt #(k+1) and can be approximated to Vtgt #(k)+ΔVtgt #(k). According to the above relationship, Vtgt #(k+1)=2×Vtgt #(k)−Vtgt #(k−1) and the above-described Eq. (16) is obtained when Eq. (21) is rearranged using the above.

As described above, according to the modified example of the second embodiment, the equivalent control input is determined using the temporary target speed Vtgt #before correction by the primary controller 166Ba, thereby preventing the control from diverging and performing speed adjustment and alignment more quickly.

Third Embodiment

Hereinafter, a third embodiment will be described. An automated driving control device 100 of the third embodiment includes both the function of the guidance controller 166A of the first embodiment and the function of the guidance controller 166B of the second embodiment and one of the above functions can be selected and executed. A state in which the function of the guidance controller 166A of the first embodiment is selected is referred to as a first mode and a state in which the function of the guidance controller 166B of the second embodiment is selected is referred to as a second mode. The automated driving control device 100 of the third embodiment may switch between whether to execute the first mode or the second mode based on the input operation performed by the occupant using the HMI 30. The automated driving control device 100 of the third embodiment may be configured to execute the first mode with priority given to ride comfort when the distance D is greater than a threshold value and execute the second mode with priority given to quick alignment when the distance D is less than the threshold value. The automated driving control device 100 of the third embodiment may switch between whether to execute the first mode or the second mode based on information such as a degree of congestion and an average speed in the second lane L2.

Comparison Between Embodiments

Figure 8:
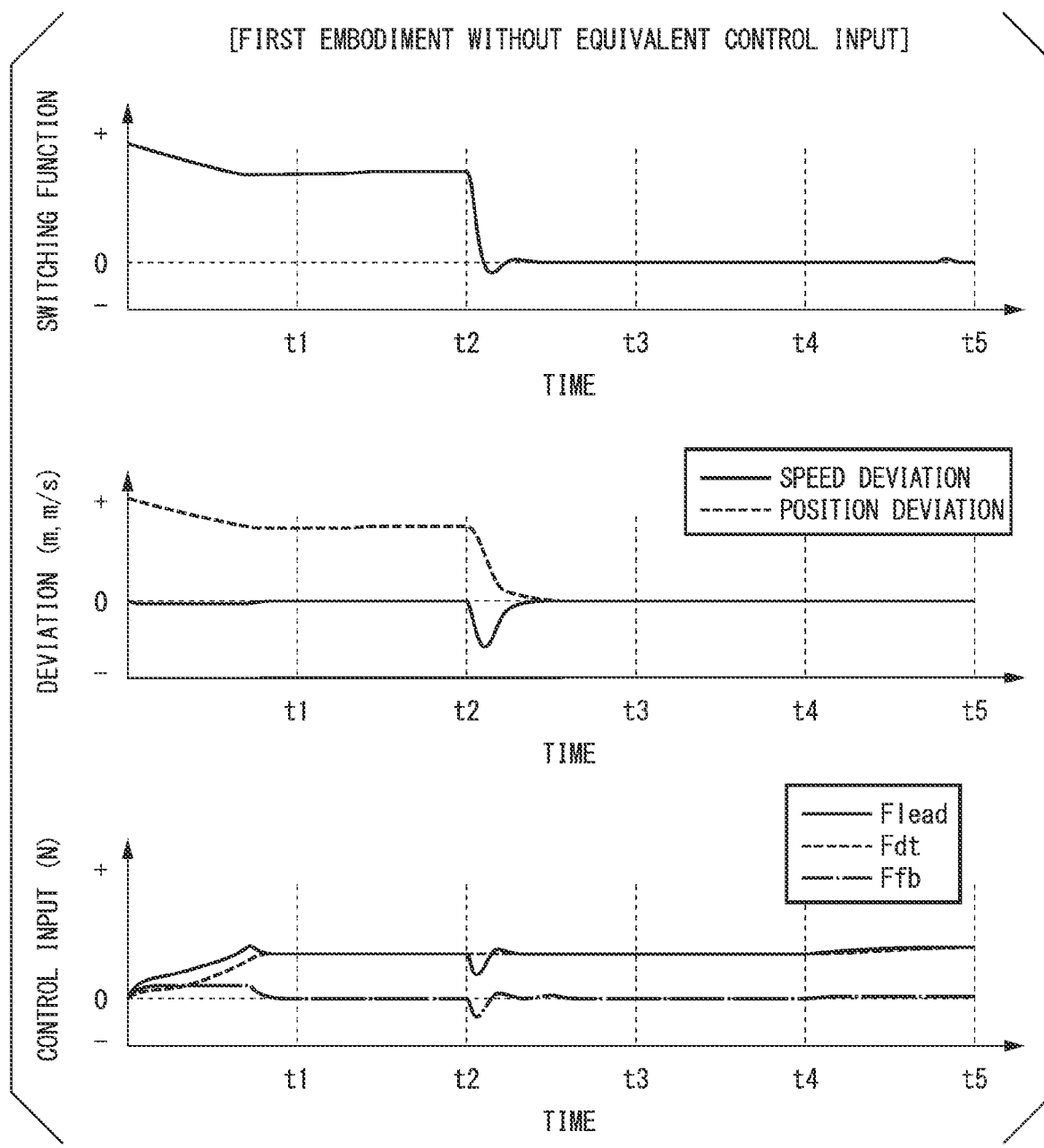
FIG. 8 is a diagram showing results of simulation of each embodiment.
Figure 9:
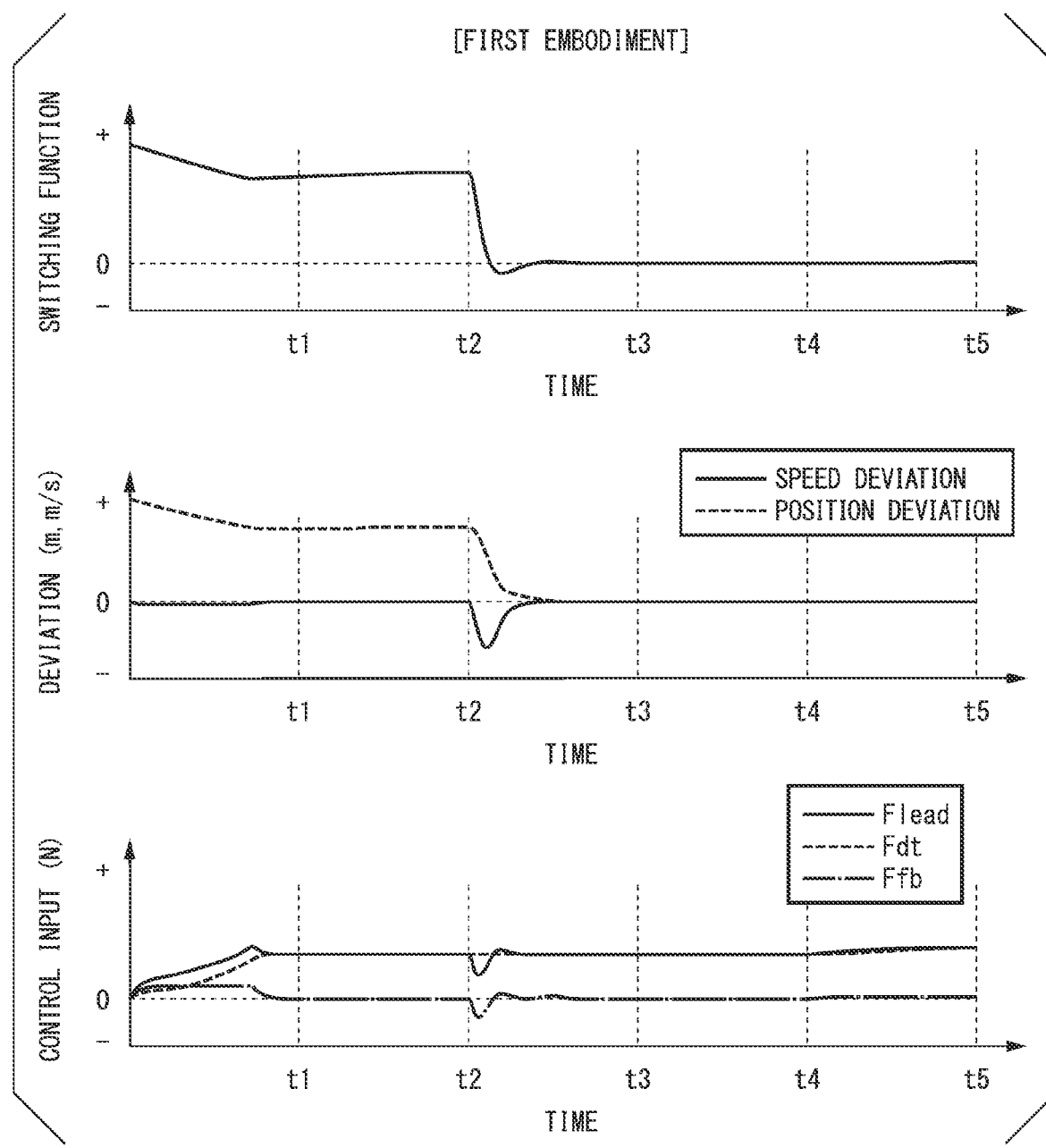
FIG. 9 is a diagram showing results of simulation of each embodiment.
Figure 10:
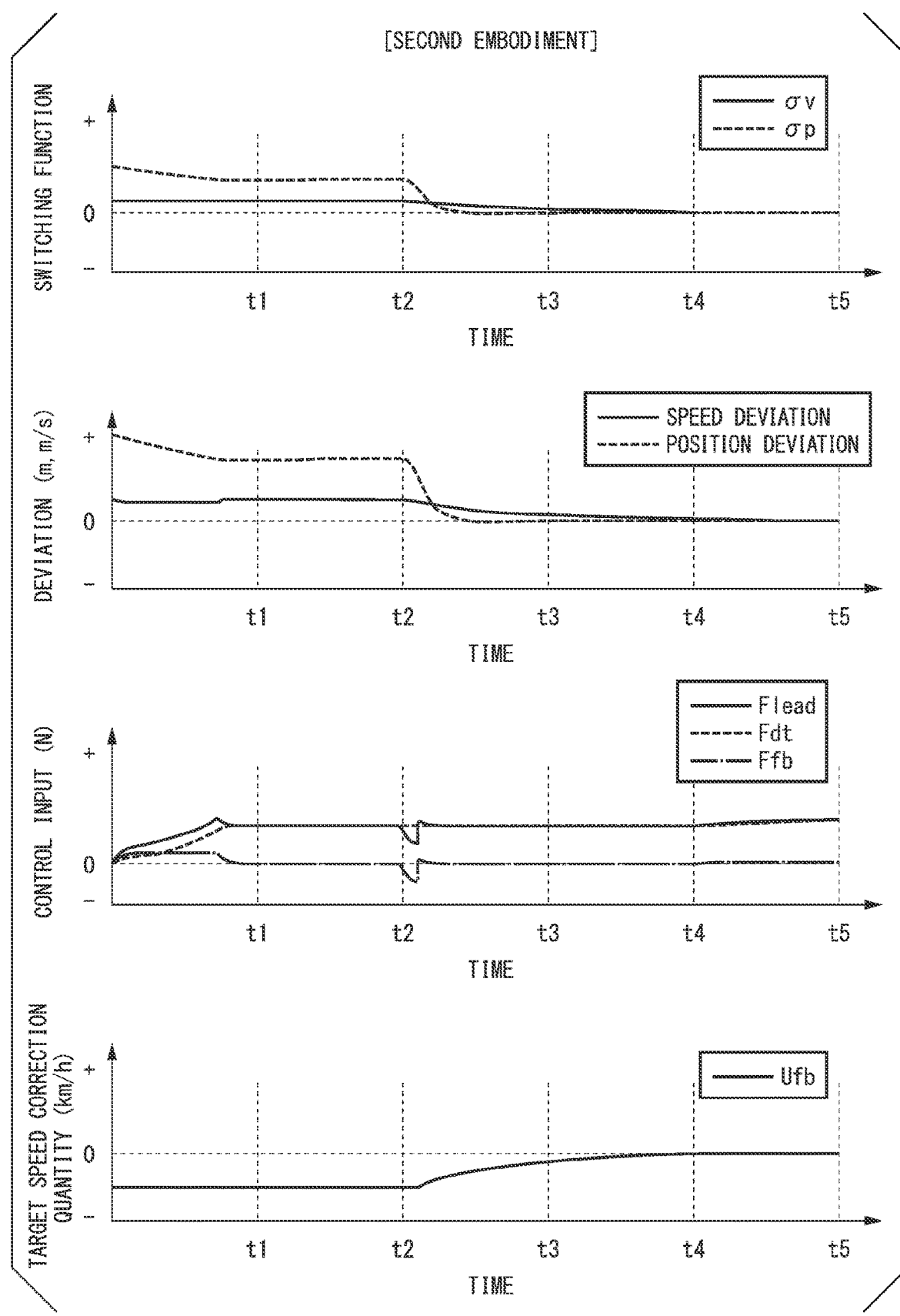
FIG. 10 is a diagram showing results of simulation of each embodiment.
Figure 11:
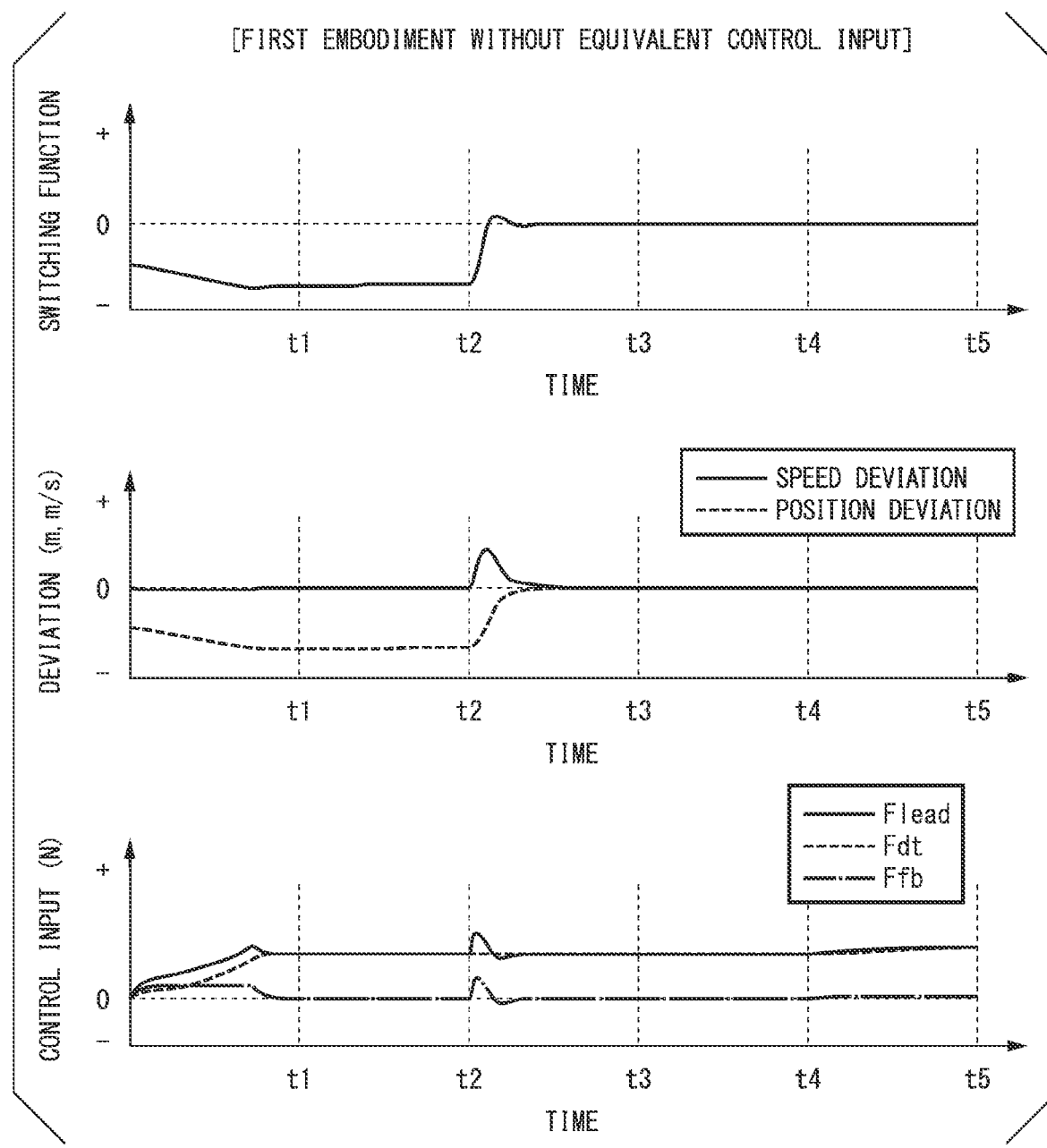
FIG. 11 is a diagram showing results of simulation of each embodiment.
Figure 12:
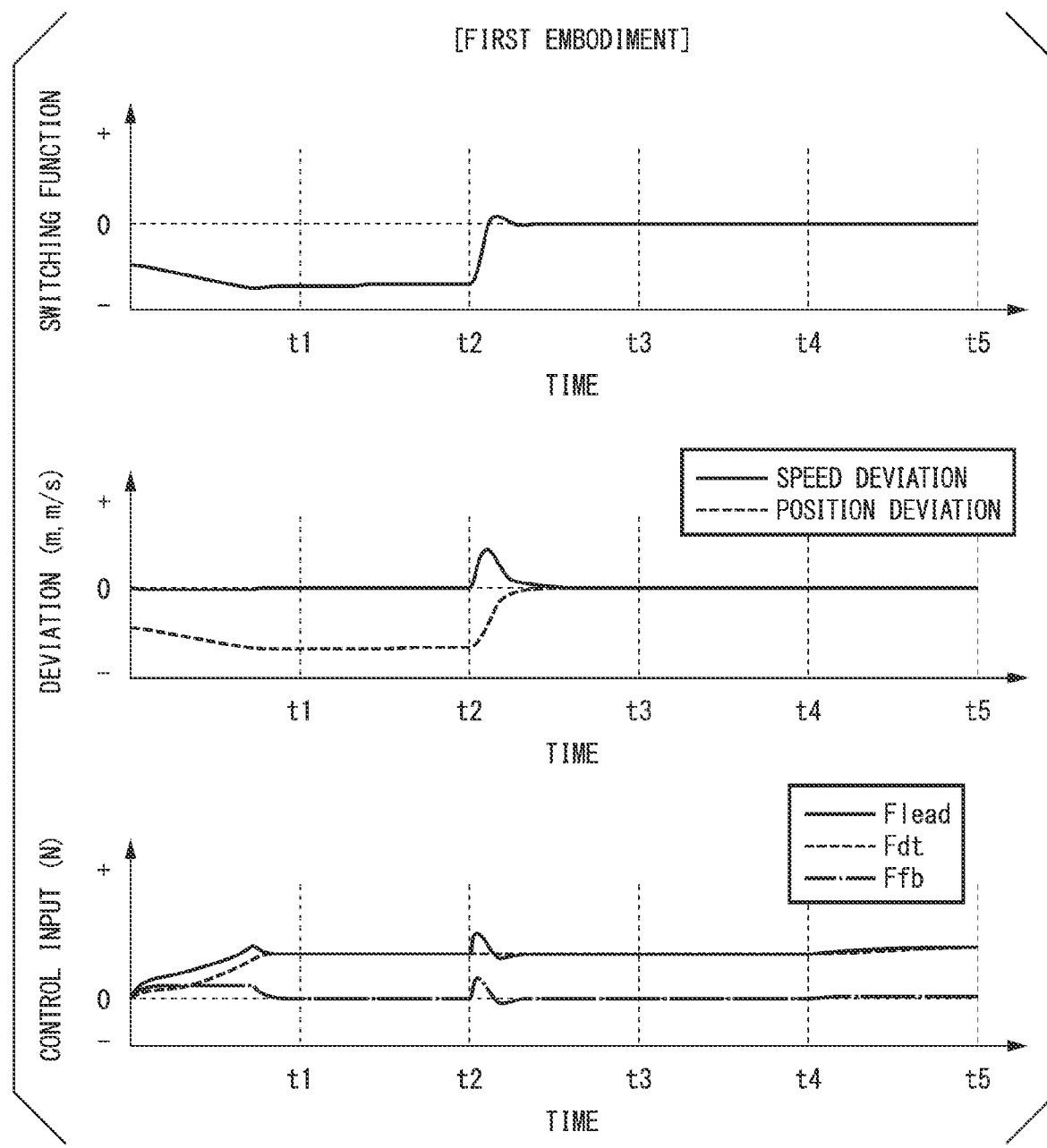
FIG. 12 is a diagram showing results of simulation of each embodiment.
Figure 13:
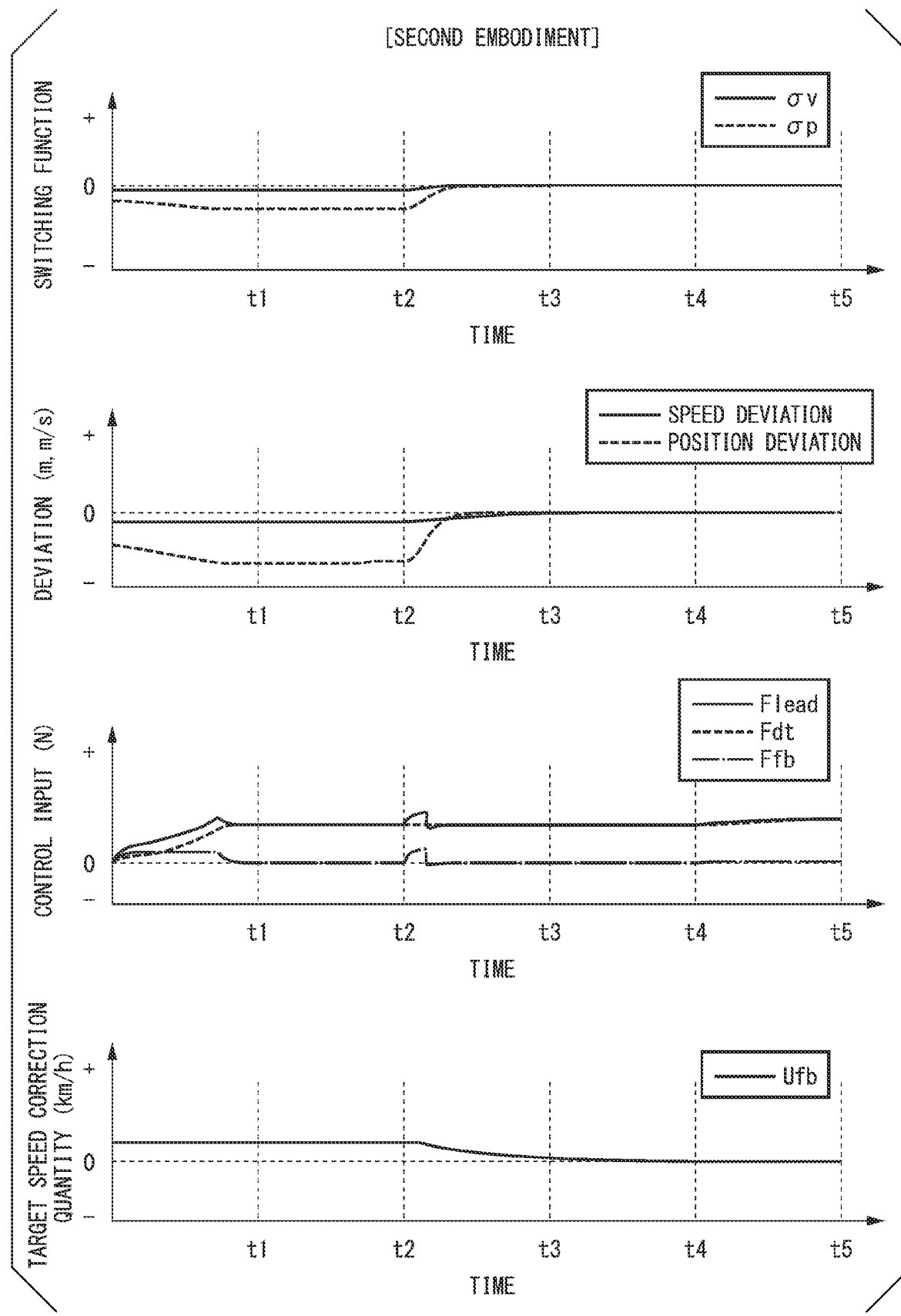
FIG. 13 is a diagram showing results of simulation of each embodiment.

FIGS. 8 to 13 show results of simulations performed by the inventors of the present application for each embodiment by giving a virtual environment to a virtual machine having the functions of each embodiment. FIGS. 8 to 10 show a case of merge-point-related movement when deceleration is performed and FIGS. 11 to 13 show a case of merge-point-related movement when acceleration is performed.

In the examples of FIGS. 8 to 10, the position deviation Ept starts with a positive value (the host vehicle M is in front of the target relative position Ptgt) and a positive guidance feedback driving force Ffb is generated to eliminate the initial speed deviation Evt. Thereafter, a negative guidance feedback driving force Ffb is generated to cause the host vehicle M to decelerate and cause the position deviation Ept to converge to zero. The speed deviation Evt caused by the above deceleration is also induced to converge to zero when the position deviation Ept converges to zero.

In the examples of FIGS. 11 to 13, the position deviation Ept starts with a negative value (the host vehicle M is behind the target relative position Ptgt), a positive guidance feedback driving force Ffb is generated to eliminate the initial position deviation Ept. Thereafter, the positive guidance feedback driving force Ffb is generated to cause the host vehicle M to accelerate and cause the position deviation Ept to converge to zero again. The speed deviation Evt caused by the acceleration is also induced to converge to zero when the position deviation Ept converges to zero. In FIGS. 11 to 13, the position deviation Ept decreases once from the initial state because the ACC mode, i.e., the control with only the speed as the target value, is performed until time t2 and no alignment control is performed.

FIGS. 8 and 11 show simulation results when the term of the equivalent control input Ffb_eq is not included in the calculation in the first embodiment, FIGS. 9 and 12 show simulation results according to the first embodiment, and FIGS. 10 and 13 show a simulation result according to the second embodiment. When FIGS. 8 and 9 and FIGS. 11 and 12 are compared, the first embodiment converges to zero with a minute deviation faster than the first embodiment (without an equivalent control input). When FIGS. 9 and 10 and FIGS. 12 and 13 are compared, the second embodiment converges to a zero position deviation faster than the first embodiment, but the second embodiment converges to a zero speed deviation slower than the first embodiment. Thus, the characteristics of each of the embodiments described above are supported by simulation.

<Others>

Each embodiment described above is based on the premise that the present invention is applied to an automated driving control device that controls both a speed and steering. Alternatively, the present invention may be applied to a driving assistance device that controls only a speed in a situation of merge-point-related movement. In this case, the driving assistance device has a configuration in which the risk distribution predictor 135, the steering controller 154, and the like are omitted from the automated driving control device 100 of the embodiment, controls a speed to align the position with the target relative position Ptgt when the target parameter determiner 152 determines the target relative position Ptgt and the target relative speed Vmt, and allows a driver to perform steering for lateral movement. Likewise, according to the above configuration, smoother speed adjustment can be performed.

[Hardware Configuration]

Figure 14:
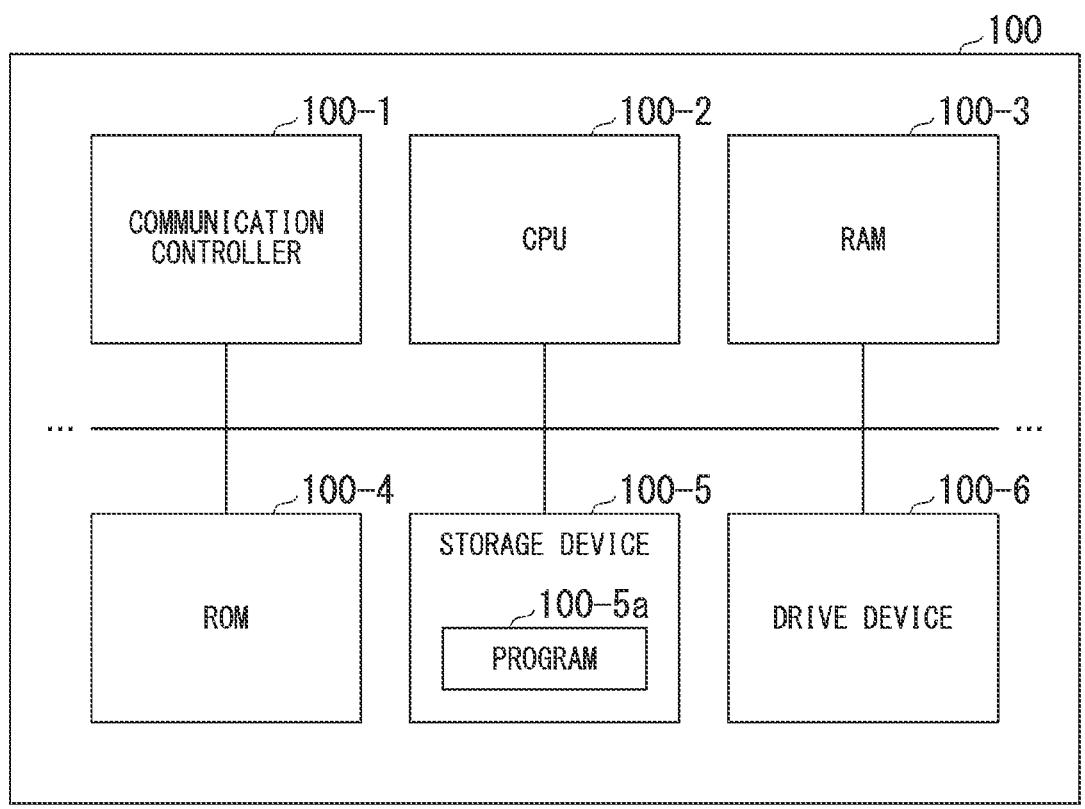
FIG. 14 is a diagram showing an example of a hardware configuration of the automated driving control device of each embodiment.

FIG. 14 is a diagram showing an example of a hardware configuration of the automated driving control device 100 according to each embodiment. As shown in FIG. 14, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an HDD, a drive device 100-6, and the like are mutually connected by an internal bus or a dedicated communication line. The communication controller 100-1 communicates with components other than the automated driving control device 100. The storage device 100-5 stores a program 100-5a to be executed by the CPU 100-2. This program is loaded into the RAM 100-3 by a direct memory access (DMA) controller (not shown) or the like and is executed by the CPU 100-2. Thereby, one or both of the first controller 120 and the second controller 180 are implemented.

The embodiment described above can be represented as follows.

A vehicle control device including:
a storage device storing a program; and
a hardware processor,
wherein the hardware processor executes the program stored in the storage device to:
recognize a surrounding situation of a host vehicle,
control a speed and steering of the host vehicle based on the surrounding situation,
determine a target relative position between two other vehicles in a state in which there is no vehicle in a second lane when the host vehicle is allowed to perform merge-point-related movement or a lane change from a first lane to the second lane,
determine a target speed serving as a target when the host vehicle reaches the target relative position, and
adjust the speed of the host vehicle according to pole-assignment control based on a position deviation that is a deviation between the target relative position and a position of the host vehicle in a road extension direction and a vehicle speed deviation that is a deviation between the speed of the host vehicle and the target speed.

Although modes for carrying out the present invention have been described using embodiments, the present invention is not limited to the embodiments, and various modifications and substitutions can also be made without departing from the scope and spirit of the present invention.

What is claimed is:

1. A vehicle control device comprising:
a storage device storing a program; and
a hardware processor,
wherein the hardware processor executes the program stored in the storage device to:
recognize a surrounding situation of a host vehicle,
control at least a speed of the host vehicle based on the surrounding situation,
determine a target relative position between two other vehicles in a state in which there is no vehicle in a second lane when the host vehicle is allowed to perform merge-point-related movement or a lane change from a first lane to the second lane,
determine a target speed serving as a target when the host vehicle reaches the target relative position, and
adjust the speed of the host vehicle so that a function in which a position deviation and a speed deviation are coupled linearly is approximated to zero,
wherein the position deviation is a deviation between the target relative position and a position of the host vehicle in a road extension direction and the speed deviation is a deviation between the speed of the host vehicle and the target speed.

2. The vehicle control device according to claim 1, wherein the hardware processor determines the target speed based on speeds of one or both of the two other vehicles in the state in which there is no vehicle in the second lane when the target speed is determined.

3. The vehicle control device according to claim 1, wherein the hardware processor adjusts the speed of the host vehicle by determining a control input given to a speed adjustment device of the host vehicle so that the function is approximated to zero and the position deviation and the speed deviation are approximated to zero.

4. The vehicle control device according to claim 3, wherein the hardware processor determines the control input in addition to an equivalent control input for constraining the function to zero after the function becomes zero.

5. The vehicle control device according to claim 1, wherein the hardware processor is able to execute a first mode in which the speed of the host vehicle is adjusted by determining a control input given to a speed adjustment device of the host vehicle so that a function in which the position deviation and the speed deviation are coupled linearly is approximated to zero and the position deviation and the speed deviation are approximated to zero and a second mode in which a correction quantity of the target speed is determined so that a first function in which the position deviation and a previous value of the position deviation are coupled linearly is approximated to zero and the position deviation and the previous value of the position deviation are approximated to zero, the target speed is determined by correcting a temporary target speed based on speeds of one or both of the two other vehicles by the correction quantity, and the speed of the host vehicle is adjusted by determining a control input given to a speed adjustment device of the host vehicle so that a second function in which the speed deviation and a previous value of the speed deviation are coupled linearly is approximated to zero and the speed deviation and the previous value of the speed deviation are approximated to zero, and wherein the hardware processor adjusts the speed of the host vehicle by selecting one of the first mode and the second mode.

6. The vehicle control device according to claim 1,
wherein the hardware processor sets a guidance parameter in the control in accordance with a traveling environment of the host vehicle.

7. A vehicle control device comprising:
a storage device storing a program; and
a hardware processor,
wherein the hardware processor executes the program stored in the storage device to:
  recognize a surrounding situation of a host vehicle,
  control at least a speed of the host vehicle based on the surrounding situation,
  determine a target relative position between two other vehicles in a state in which there is no vehicle in a second lane when the host vehicle is allowed to perform merge-point-related movement or a lane change from a first lane to the second lane,
  determine a target speed serving as a target when the host vehicle reaches the target relative position, and
  adjust the speed of the host vehicle based on a position deviation that is a deviation between the target relative position and a position of the host vehicle in a road extension direction and a vehicle speed deviation that is a deviation between the speed of the host vehicle and the target speed,
wherein the hardware processor determines a correction quantity of the target speed so that a first function in which the position deviation and a previous value of the position deviation are coupled linearly is approximated to zero and the position deviation and the previous value of the position deviation are approximated to zero, wherein the hardware processor determines the target speed by correcting a temporary target speed based on speeds of one or both of the two other vehicles by the correction quantity, and wherein the hardware processor adjusts the speed of the host vehicle by determining a control input given to a speed adjustment device of the host vehicle so that a second function in which the speed deviation and a previous value of the speed deviation are coupled linearly is approximated to zero and the speed deviation and the previous value of the speed deviation are approximated to zero.

8. The vehicle control device according to claim 7,
wherein the hardware processor determines the control input in addition to an equivalent control input for constraining the first function and the second function to zero after the first function and the second function becomes zero, and
wherein the equivalent control input is determined based on the temporary target speed.

9. A vehicle control method comprising:
recognizing, by a hardware processor, a surrounding situation of a host vehicle;
controlling, by the hardware processor, at least a speed of the host vehicle based on the surrounding situation, and
determining, by the hardware processor, a target relative position between two other vehicles in a state in which there is no vehicle in a second lane when the host vehicle is allowed to perform merge-point-related movement or a lane change from a first lane to the second lane, determining a target speed serving as a target when the host vehicle reaches the target relative position, and adjusting the speed of the host vehicle so that a function in which a position deviation and a speed deviation are coupled linearly is approximated to zero,
wherein the position deviation is a deviation between the target relative position and a position of the host vehicle in a road extension direction and the speed deviation is a deviation between the speed of the host vehicle and the target speed.

* * * * *